(12) United States Patent
Wakisaka et al.

(10) Patent No.: US 7,391,332 B2
(45) Date of Patent: Jun. 24, 2008

(54) RADIATION INFORMATION MANAGEMENT DEVICE AND COMMUNICATION DEVICE

(75) Inventors: Toshiyuki Wakisaka, Iizuka (JP);
Masahiro Maki, Kasuya-Gun (JP);
Tsunehiro Hanada, Fukuoka (JP);
Mutsuhiko Oishi, Iizuka (JP); Fumio Ichihara, Chikushi-Gun (JP); Akihiro Yamashita, Miyaki-Gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 417 days.

(21) Appl. No.: 11/085,063

(22) Filed: Mar. 22, 2005

(65) Prior Publication Data

US 2005/0231040 A1    Oct. 20, 2005

(30) Foreign Application Priority Data

Mar. 30, 2004    (JP)    ............................. 2004-098925

(51) Int. Cl.
*G08B 17/12*    (2006.01)
(52) U.S. Cl. .................... 340/600; 340/561; 455/14; 455/523; 455/282
(58) Field of Classification Search ................ 340/561, 340/562, 600; 455/14, 523, 282, 327
See application file for complete search history.

(56) References Cited

U.S. PATENT DOCUMENTS

| | | | | |
|---|---|---|---|---|
| 3,641,439 A | * | 2/1972 | Aslan ......................... | 343/703 |
| 3,868,689 A | * | 2/1975 | Liu et al. ..................... | 342/385 |
| 5,168,265 A | * | 12/1992 | Aslan ......................... | 340/600 |
| 5,991,269 A | * | 11/1999 | Williamson et al. ......... | 370/241 |
| 2005/0238107 A1 | * | 10/2005 | Yamashita et al. .......... | 375/258 |
| 2006/0252390 A1 | * | 11/2006 | Bendov ....................... | 455/117 |

FOREIGN PATENT DOCUMENTS

| | | |
|---|---|---|
| EP | 1 008 856 | 6/2000 |
| GB | 2 298 718 | 9/1996 |
| GB | 2298718 A * | 9/1996 |
| JP | 11-14680 | 1/1999 |
| JP | 2000-346886 | 12/2000 |
| JP | 2001-91555 | 4/2001 |

* cited by examiner

*Primary Examiner*—Daniel Wu
*Assistant Examiner*—Edny Labbees
(74) *Attorney, Agent, or Firm*—Wenderoth, Lind & Ponack, L.L.P.

(57) ABSTRACT

A radiation information management device comprises a measuring unit, a comparing unit, and a management information generating unit. The measuring unit measures unwanted radio wave radiation radiated from a balanced transmission line. The comparing unit compares a measured value of unwanted radio wave radiation, which the measuring unit has measured, with a reference value that is predetermined, and then notifies the comparison result to the management information generating unit. The management information generating unit refers the comparison result, generates the management information related to the unwanted radio wave radiation including information showing that the measured value is exceeded the reference value, then notifies to a first communication device and a second communication device. The first communication device and the second communication device take a measure to reduce transmitting power based on the management information regarding the unwanted radio wave radiation. Thus, in the first communication device and the second communication device, the unwanted radio wave radiation radiated from the balanced transmission line can be controlled within the reference value.

11 Claims, 6 Drawing Sheets

RADIATION INFORMATION MANAGEMENT DEVICE AND COMMUNICATION DEVICE

BACKGROUND OF THE INVENTION

1. Field of the Invention

The present invention relates to a communication device performing data transmission using a balanced transmission line, and a related art thereof.

2. Description of the Related Art

Balanced transmission systems are known for transmitting data in a differential mode to a balanced transmission line that comprises a pair of communication cables. As one of such balanced transmission systems, there is a power line communication system in which, superimposing a high frequency signal, data is transmitted by a pair of metallic cables that are originally used for power transmission.

The power line communication system is expected to spread to a general house with rapid development of information appliances. The power line communication system in a general house possesses such an advantage that a power line already installed in the house can be used as a balanced transmission line without laying a new cable, when a plurality of computers are to be mutually connected or when a computer is to be connected to other information appliances in the house.

When data transmission is performed using a pair of such metallic cables, there is a problem of EMC (Electromagnetic Compatibility) caused by the unbalance of the pair of the metallic cables used as the transmission line.

FIG. 8 is an illustration showing a balanced transmission system according to the prior art. In FIG. 8, a transmitter 1 and a receiver 2 perform data transmission via a balanced transmission line consisting of metallic cables (a line 3 and a line 4). In the balanced transmission system, the balanced transmission line is originally required to be completely balanced all the way from the transmitter 1 to the receiver 2. However, in fact, there are unbalance factors in circuits of the transmitter 1 and in circuits of the receiver 2, and unbalance components somewhere along the line. Therefore, it cannot be necessarily said that the balanced transmission line is completely balanced.

For example, in the power line communication system using the power line in the house, suppose that the transmitter 1 of FIG. 8 is a modem (for a personal computer) that is connected to an outlet of a living room, and that the receiver 2 is a modem (for a printer) that is connected to an outlet of a study room. When the personal computer in the living room and the printer in the study room perform balanced transmission of data via the power line in the house, another home appliance such as a cleaner is inserted into another outlet in the same house, then the cleaner works as a leakage resistance 6 of FIG. 8, and becomes one of the unbalanced factors for the balanced transmission line (the line 3 and the line 4).

Because of such imperfect balance of the balanced transmission line constituting the balanced transmission system, the EMC problem as mentioned above occurs.

In the EMC problem, there is influence that an unwanted radio wave radiation from the balanced transmission line (the line 3 and the line 4) of the FIG. 8 hurts the other appliances, and influence that a noise entering to the balanced transmission line (the line 3 and the line 4) from the other appliances hurts the balanced transmission system concerned. When the degree of balance of the balanced transmission line deteriorates, the unwanted radio wave radiation increases and a greater problem is caused. The above-mentioned EMC problem is referred to in detail in a reference 1 ("The electromagnetism noise problem of a telecommunications system and its countermeasure technique," written by Ken Ideguchi and the other, published by Morikita Shuppan on Nov. 25, 1997, P. 99-134).

Therefore, in order to solve the EMC problem in the balanced transmission system, an precise measurement of the unwanted radio wave radiation resulting from deterioration in the degree of balance of the balanced transmission line and a reduction measure for the unwanted radio wave radiation based on the result of the measurement are important.

However, the prior balanced transmission system cannot fully solve the problem mentioned above.

OBJECTS AND SUMMARY OF THE INVENTION

An object of the present invention is to provide a radiation information management device that can measure unwanted radio wave radiation and manage the unwanted radio wave radiation based on the result of the measurement, and also to provide a communication device that can reduce unwanted radio wave radiation based on the result of the measurement.

A first aspect of the present invention provides a radiation information management device comprising: a measuring unit operable to measure radio wave radiation from a balanced transmission line used by a communication device, thereby outputting a measured radiation value; and a comparing unit operable to compare the measured radiation value with a predetermined reference value, thereby outputting a compared result, wherein the comparing unit informs the communication device of the compared result when the measured radiation value exceeds the predetermined reference value.

According to the present structure, the radiation information management device can measure the unwanted radio wave radiation of the balanced transmission line, compare the measured value with the reference value such as permissible value of unwanted radiation, and notify the communication device of the compared result when the measured value exceeds the reference value. The communication device can take a measure for reducing the unwanted radio wave radiation based on the received notice.

A second aspect of the present invention provides the radiation information management device as defined in the first aspect, further comprising: a management information generating unit operable to generate management information on the radio wave radiation, wherein when the measured radiation value exceeds the predetermined reference value, the management information generating unit generates the management information and informs the communication device of the management information.

According to the present structure, the radiation information management device can measure the unwanted radio wave radiation of the balanced transmission line, compare the measured value with the reference value such as permissible value of unwanted radiation, and generate the management information regarding the radio wave radiation based on the compared result and notify the communication device of the result. The communication device can take a measure for reducing the unwanted radio wave radiation based on the received management information.

A third aspect of the present invention provides the radiation information management device as defined in the second aspect, wherein the measuring unit measures radio wave radiation from the balanced transmission line for a pre-designated frequency, thereby outputting a measured radiation value, wherein the comparing unit compares the measured radiation value with a predetermined reference value. When the measured radiation value exceeds the predetermined reference value, the management information generating unit generates the management information that includes information on the pre-designated frequency at which the measured radiation value exceeds the predetermined reference value.

According to the present structure, the radiation information management device can generate management information indicating the frequency that the unwanted radio wave radiation exceeds the reference value, therefore the communication device, upon receipt of the management information, can perform the reduction measure for the unwanted radio wave radiation for every frequency, minutely and effectively.

A forth aspect of the present invention provides the radiation information management device as defined in the first aspect, wherein the measuring unit measures an average effective value of the radio wave radiation from the balanced transmission line in a frequency range that the communication device uses.

According to the present structure, the radiation information management device measures a value of the unwanted radio wave radiation as an average effective value in the whole frequency range used by the communication device; therefore the radiation information management device can measure the value of unwanted radio wave radiation using a simple device.

A fifth aspect of the present invention provides the radiation information management device as defined in the first aspect, wherein the measuring unit measures the radio wave radiation from the balanced transmission line at a transmitting end of the balanced transmission line.

According to the present structure, the radiation information management device measures the radio wave radiation at the transmitting end of the balanced transmission line where the unwanted radiation radio wave is usually expected to be strongest in the balanced transmission line; therefore the most efficient reduction measure for the unwanted radio wave radiation can be performed.

A sixth aspect of the present invention provides the radiation information management device as defined in the first aspect, wherein the measuring unit measures the radio wave radiation from the balanced transmission line at a receiving end of the balanced transmission line.

According to the present structure, when a degree of balance of the transmission line changes somewhere along the balanced transmission line, causing the radio wave radiation stronger at the receiving end rather than at the transmitting end of the balanced transmission line, effective reduction measure for unwanted radiation can be taken.

A seventh aspect of the present invention provides the radiation information management device as defined in the first aspect, wherein the measuring unit measures the radio wave radiation from the balanced transmission line utilizing electromagnetic induction by a coil.

An eighth aspect of the present invention provides the radiation information management device as defined in the seventh aspect, wherein the coil is one of a core-less coil and a cored coil.

A ninth aspect of the present invention provides the radiation information management device as defined in the seventh aspect, wherein the coil is a thin film coil.

According to the present structures, the radiation information management device can measure the radio wave radiation of the balanced transmission line by using the most commonly used coil whose operation is stable.

A tenth aspect of the present invention provides the radiation information management device as defined in the first aspect, wherein the measuring unit measures the radio wave radiation from the balanced transmission line utilizing a magnetic field sensitive semiconductor element.

According to the present structure, the radiation information management device can measure the radiation radio wave of the balanced transmission line efficiently using the magnetic field sensitive semiconductor element like a hole element. A small radiation information management device is realizable by installing the hole element as a part of an electronic circuit thereof.

An eleventh aspect of the present invention provides a communication device operable to perform communication using a balanced transmission line, the communication device comprising: a transmitting unit operable to transmit a signal to the balanced transmission line; a control unit operable to control transmitting power put into the balanced transmission line by the transmitting unit; and a radiation information management unit operable to manage radiation information on radio wave radiation from the balanced transmission line. The radiation information management unit comprises: a measuring unit operable to measure the radio wave radiation from the balanced transmission line, thereby outputting a measured radiation value; and a comparing unit operable to compare the measured radiation value with a predetermined reference value, thereby outputting a compared result. The comparing unit informs the control unit of the compared result when the measured radiation value exceeds the predetermined reference value, and the control unit controls the transmitting power put into the balanced transmission line by the transmitting unit, based on the compared result.

According to the present structure, the radiation information management unit measures the unwanted radio wave radiation of the balanced transmission line, compares the measured value with the reference value such as a permissive value of the unwanted radiation. The control unit controls the transmitting power that the transmitting unit applies to the balanced transmission line when the measured value exceeds the reference value. Therefore, the transmitting power can be controlled not to emit the radio wave radiation beyond the reference value.

A twelfth aspect of the present invention provides the communication device as defined in the eleventh aspect, wherein the radiation information management unit further comprises a management information generating unit operable to generate management information on the radio wave radiation, wherein when the measured radiation value exceeds the predetermined reference value, the management information generating unit generates the management information and informs the control unit of the management information, and wherein the control unit controls the transmitting power put into the balanced transmission line by the transmitting unit, based on the management information.

According to the present structure, the radiation information management unit measures the unwanted radio wave radiation of the balanced transmission line, compares the measured value with the reference value such as a permissive value of the unwanted radiation, and generates management information regarding the radio wave radiation based on the result when the measured value exceeds the reference value. The control unit controls the transmitting power that the transmitting unit applies to the balanced transmission line, based on the management information. Therefore, the transmitting power can be controlled not to emit the radiation electric wave beyond the reference value.

A thirteenth aspect of the present invention provides the communication device as defined in the twelfth aspect, wherein the measuring unit measures radio wave radiation from the balanced transmission line for a pre-designated frequency, thereby outputting a measured radiation value, wherein the comparing unit compares the measured radiation value with a predetermined reference value. When the measured radiation value exceeds the predetermined reference value, the management information generating unit generates the management information that includes information on the pre-designated frequency at which the measured radiation value exceeds the predetermined reference value.

According to the present structure, the radiation information management unit generates the management information indicating the frequency that the unwanted radio wave radiation exceeds the reference value, therefore a reduction measure of the unwanted radio wave radiation can be taken based on the management information so as to reduce the transmitting power of a career relating to the frequency at which the unwanted radio wave radiation exceeds the reference value.

A fourteenth aspect of the present invention provides the communication device as defined in the eleventh aspect, wherein the measuring unit measures an average effective value of the radio wave radiation from the balanced transmission line in a frequency range that the communication device uses.

According to the present structure, the radiation information management unit measures the unwanted radio wave radiation as the average effective value in the whole frequency range used by the communication device. The control unit can control the unwanted radio wave radiation based on the result of the measurement. Therefore, suppression of the unwanted radio wave radiation can be simply controlled.

A fifteenth aspect of the present invention provides the communication device as defined in the eleventh aspect, wherein the measuring unit measures the radio wave radiation from the balanced transmission line at a transmitting end of the balanced transmission line.

According to the present structure, the communication device that performs transmission measures the radio wave radiation at the transmitting end of the balanced transmission line where the unwanted radio wave radiation is expected to be strongest in the balanced transmission line; therefore the most efficient reduction measure of the unwanted radio wave radiation can be taken.

A sixteenth aspect of the present invention provides the communication device as defined in the eleventh aspect, wherein the measuring unit measures the radio wave radiation from the balanced transmission line at a receiving end of the balanced transmission line.

According to the present structure, when the degree of balance of the transmission line changes somewhere along the balanced transmission line, causing the radio wave radiation at the receiving end of the balanced transmission line stronger than at the transmitting end, the communication device at the receiving terminal measures the radio wave radiation and notifies the communication device at the transmitting terminal of the result of the measurement. Thereby, an effective reduction measure of the unwanted radio wave radiation can be taken.

A seventeenth aspect of the present invention provides the communication device as defined in the eleventh aspect, wherein the measuring unit measures the radio wave radiation from the balanced transmission line utilizing electromagnetic induction by a coil.

An eighteenth aspect of the present invention provides the communication device as defined in the seventeenth aspect, wherein the coil is one of a core-less coil and a cored coil.

A nineteenth aspect of the present invention provides the communication device as defined in the seventeenth aspect, wherein the coil is a thin film coil.

According to the present structures, the communication device can measure the radio wave radiation of the balanced transmission line by using the most commonly used coil whose operation is stable.

A twentieth aspect of the present invention provides the communication device as defined in the eleventh aspect, wherein the measuring unit measures the radio wave radiation from the balanced transmission line utilizing a magnetic field sensitive semiconductor element.

According to the present structure, the communication device can measure the radio wave radiation of the balanced transmission line efficiently by using the magnetic field sensitive semiconductor element like a hole element. A small radiation information management device can be realized by installing the hole element as a part of an electronic circuit.

The above, and other objects, features and advantages of the present invention will become apparent from the following description read in conjunction with the accompanying drawings, in which like reference numerals designate the same elements.

EMBODIMENT 1

Figure 1:
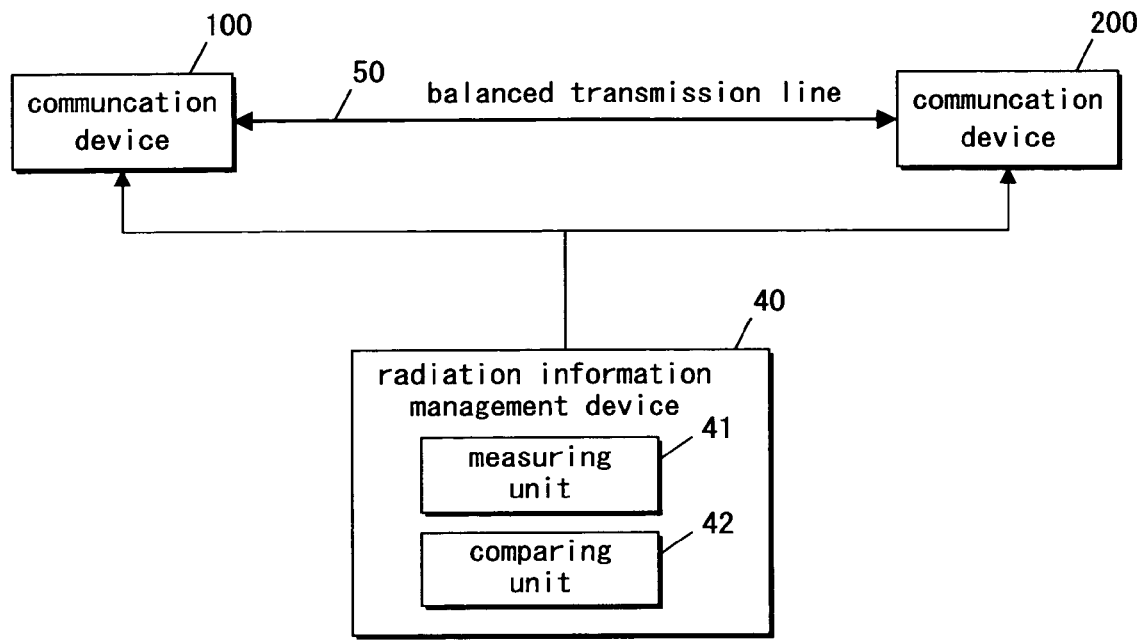
FIG. 1 is a block diagram illustrating a radiation information management device using a balanced transmission system according to Embodiment 1 of the present invention.

FIG. 1 is a block diagram of a radiation information management device 40 used for a balanced transmission system in Embodiment 1 of the present invention.

The radiation information management device 40 of the present embodiment comprises a measuring unit 41 and a comparing unit 42.

The measuring unit 41 of the radiation information management device 40 measures unwanted radio wave radiation from a balanced transmission line 50, while a communication device 100 and a communication device 200 are communicating using the balanced transmission line 50. The comparing unit 42 compares the measured value of the unwanted radio wave radiation, which the measuring unit 41 has measured, with a predetermined reference value, and sends the compared result to the communication device 100 and the communication device 200.

Now, it is supposed that the communication device 100 is a transmitting side. The communication device 100 considers the comparison result of the unwanted radio wave radiation, sent from the radiation information management device 40, and when the compared result exceeds the predetermined reference value, the communication device 100 reduces the transmitting power as a measure. Thereby, in the communication between the communication device 100 and the communication device 200, the unwanted radio wave radiation from the balanced transmission line 50 can be controlled within the reference value.

EMBODIMENT 2

Figure 2:
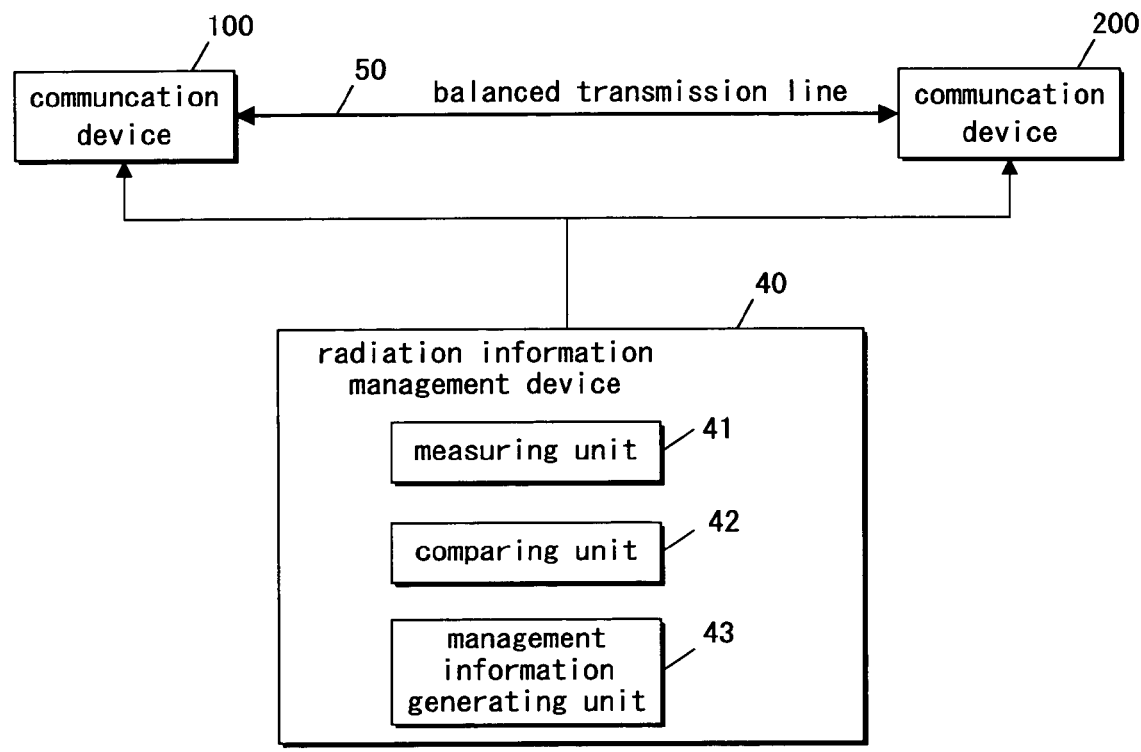
FIG. 2 is a block diagram illustrating a radiation information management device using a balanced transmission system according to Embodiment 2 of the present invention.

FIG. 2 is a block diagram of the radiation information management device 40 used for the balanced transmission system in Embodiment 2 of the present invention.

The radiation information management device 40 of the present embodiment comprises the measuring unit 41, the comparing unit 42, and a management information generating unit 43.

The measuring unit 41 of the radiation information management device 40 measures the unwanted radio wave radiation from the balanced transmission line 50, while the communication device 100 and the communication device 200 are communicating using the balanced transmission line 50. The comparing unit 42 compares the measured value of the unwanted radio wave radiation, which the measuring unit 41 has measured, with the predetermined reference value, and notifies the management information generating unit 43 of the compared result. When the measured value exceeds the predetermined reference value, the management information generating unit 43, referring to the comparison result, generates management information regarding the unwanted radio wave radiation. The management information generating unit 43 generates the management information so as to include information that the measured value has exceeded the reference value, and sends the management information to the communication device 100 and the communication device 200.

Now, it is supposed that the communication device 100 is a transmitting side. The communication device 100 considers the management information regarding the unwanted radio wave radiation sent from the radiation information management device 40. When the management information indicates that the measured value of the unwanted radio wave radiation exceeds the predetermined reference value, the communication device 100 takes a measure to reduce the transmitting power. Thereby, in the communication between the communication device 100 and the communication device 200, the unwanted radio wave radiation from the balanced transmission line 50 can be controlled within the reference value.

In the present embodiment, the radiation information management device 40 generates the management information regarding the unwanted radio wave radiation. By accumulating the management information as a data base, the radiation information management device 40 can perform fine management regarding the unwanted radio wave radiation that is suited to the environment where the balanced transmission system is set up.

The radiation information management device 40 may measure the unwanted radio wave radiation from the balanced transmission line 50 anywhere. However, it is more effective to measure the unwanted radio wave radiation from the balanced transmission line 50 near the place where the communication device 100 or the communication device 200 is set up.

In the following, a simulation of measurement for the unwanted radio wave radiation from the balanced transmission line 50 is explained. The measurement was made in an electric-wave anechoic chamber.

Figure 3:
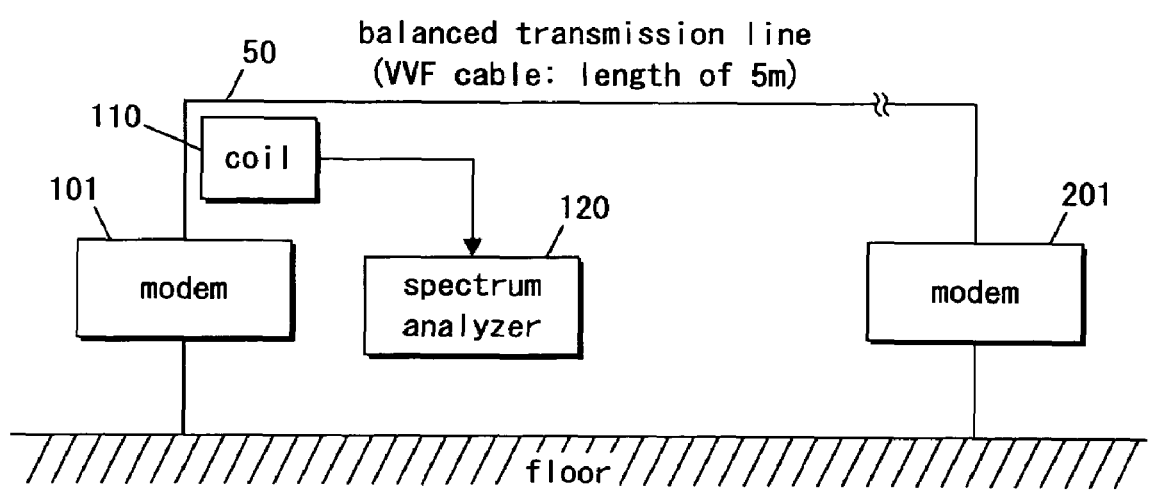
FIG. 3 is an illustration showing a simulation system for measuring unwanted radio wave radiation.

FIG. 3 illustrates the simulation system for measuring the unwanted radio wave radiation. In the electric-wave anechoic chamber, a 5 meter-long VVF cable (PVC insulated PVC sheathed flat cable; a power line cable used inside of general houses) as the balanced transmission line 50 is stretched at the height of one meter from the floor, and a modem 101 and a modem 201 are connected to both ends. Each ground terminal of the modem 101 and the modem 201 is connected to a respective ground panel arranged on the floor.

The modem 101 and the modem 201 correspond to the communication device 100 and communication device 200 of the balanced transmission system shown in FIG. 2, respectively. In the following explanation, it is supposed that the modem 101 is a transmitting terminal, and the modem 201 is a receiving terminal.

A rectangular core-less coil 110, whose size is 3 cm by 4 cm and the number of turn is 100, is used as a detection means for measuring the unwanted radio wave radiation. A spectrum analyzer 120 measures the output of the coil 110 for every frequency.

In the simulated balanced transmission system set up as above, communication is performed between the modem 101 and the modem 201. The rectangular core-less coil 110 detects the unwanted radio wave radiation from the VVF cable, and the spectrum analyzer 120 measures the output of the coil 110 for each frequency.

Figure 4:
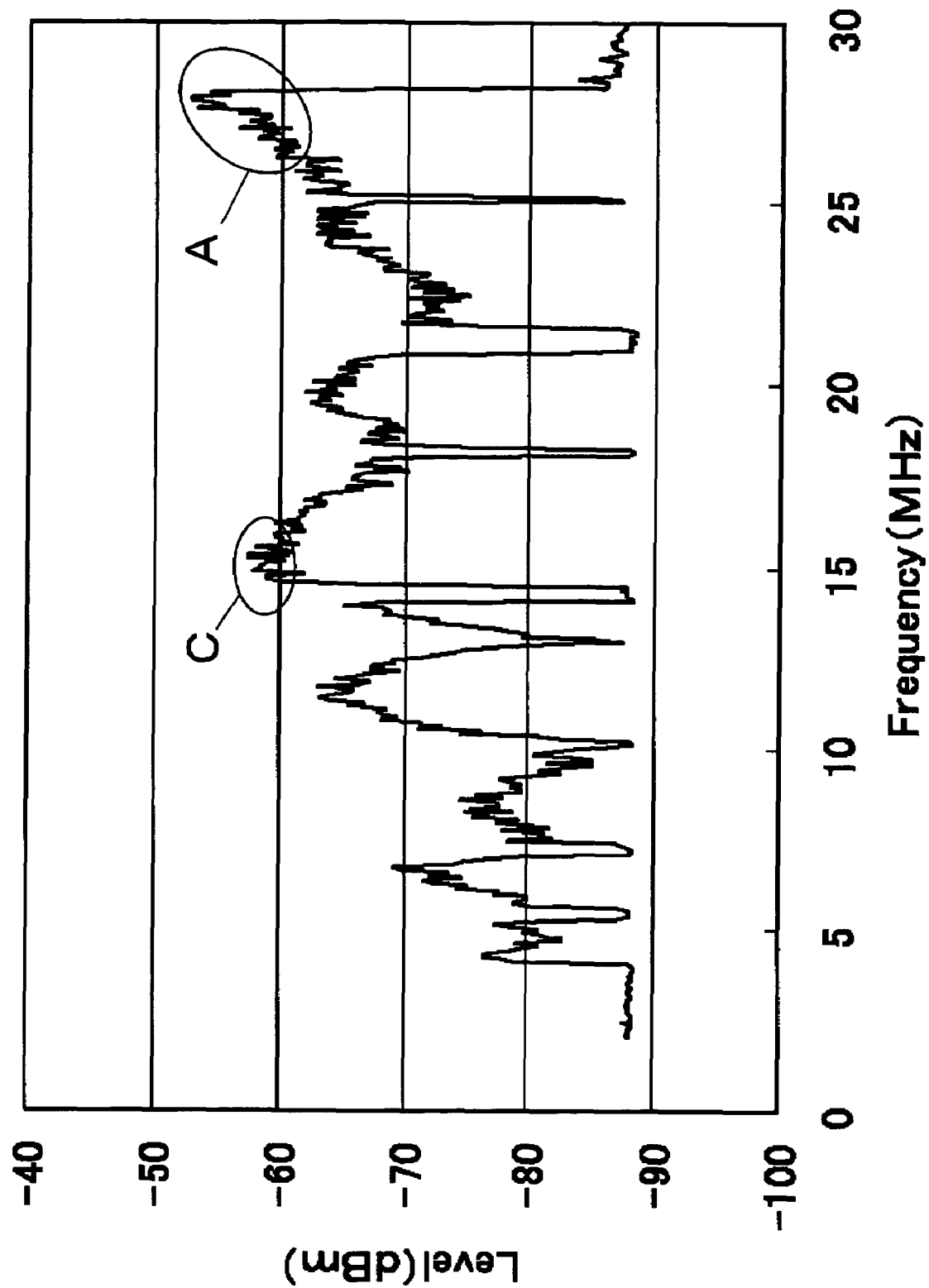
FIG. 4 is an illustration showing a result of the measurement of the simulation regarding the unwanted radio wave radiation.

FIG. 4 illustrates a measured result of the simulation regarding the unwanted radio wave radiation. FIG. 4 is the result of measurement for the unwanted radio wave radiation from the VVF cable near the transmitting terminal by setting the rectangular core-less coil 110 near the modem 101, which is the transmitting terminal.

Figure 5:
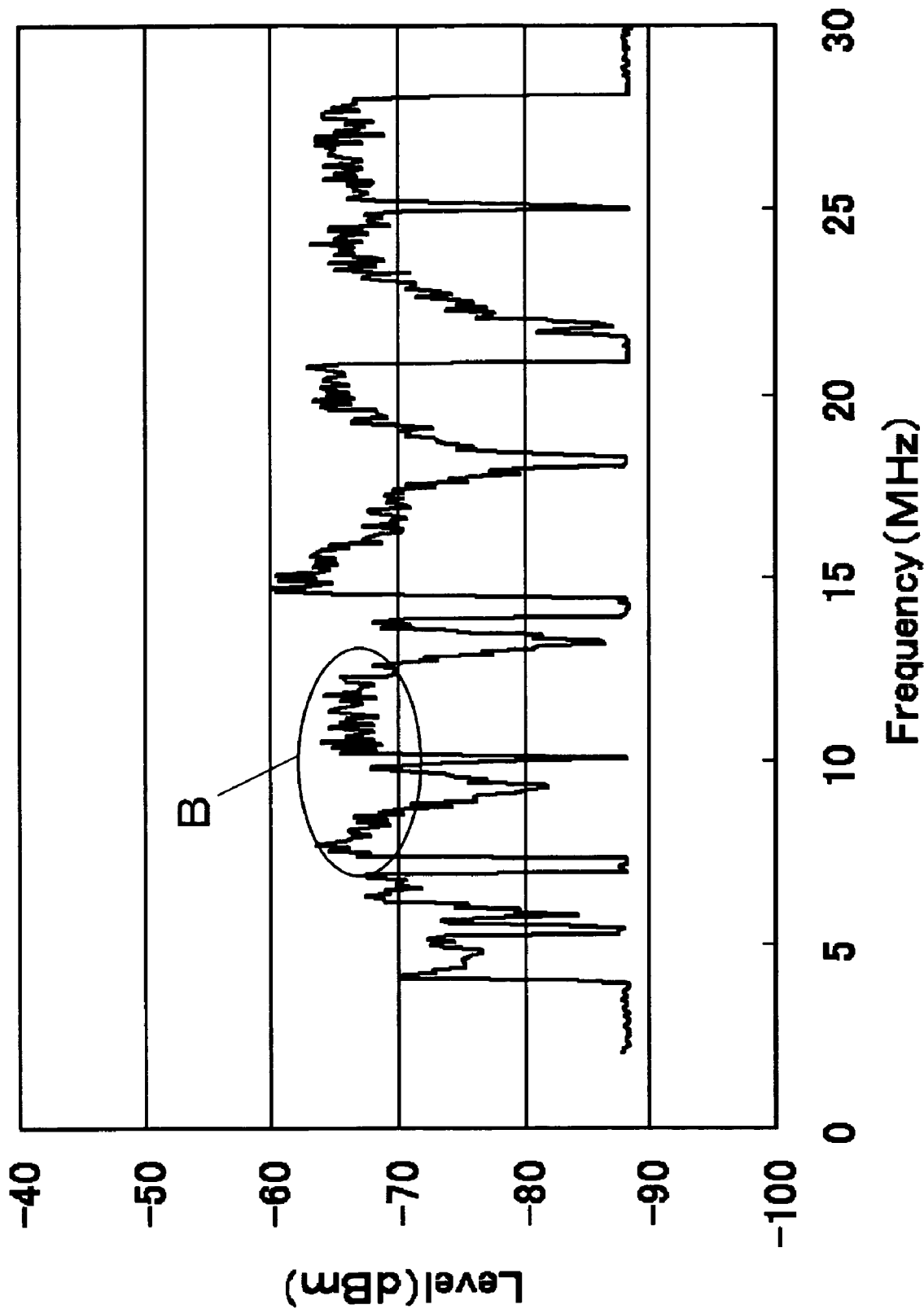
FIG. 5 is an illustration showing a result of the measurement of the simulation regarding the unwanted radio wave radiation.

FIG. 5 illustrates a measured result of the simulation regarding the unwanted radio wave radiation. FIG. 5 is the result of measurement for the unwanted radio wave radiation from the VVF cable near the receiving terminal by setting the rectangular core-less coil 110 near the modem 201, which is the receiving terminal.

In FIGS. 4 and 5, the horizontal axis indicates frequency (MHz), and the vertical axis indicates a signal level of the unwanted radio wave radiation (dBm), respectively.

In either measurement, the modem 101 and the modem 201 communicate using frequencies from 2 MHz to 30 MHz.

When comparing FIG. 4 and FIG. 5, FIG. 4 shows that the large amount of the unwanted radio wave radiation is measured in the frequency range between about 25 MHz and 28 MHz (the range A of FIG. 4), on the other hand, FIG. 5 shows that the unwanted radio wave radiation with a high intensity that is not measured in FIG. 4 is measured in the frequency range between 7 MHz and 13 MHz (the range B of FIG. 5).

Thus, in the simple simulation as mentioned above, it is seen that the frequency distribution of the unwanted radio wave radiation differs depending on the measuring place. The above-mentioned difference may occur due to a little difference in structure between the modem 101 and the modem 201, and external electric waves differently entered from the surrounding environment. In an actual home, the power distribution cable is wired more complicatedly, and other household appliances are connected to many outlets of the cable; therefore, it is easily expected that the difference of the unwanted radio wave radiation is even greater, in frequency and amplitude, depending on the measuring place.

Operation of the radiation information management device 40 of the present embodiment shown in FIG. 2 is explained, using the measured results of FIG. 4 and FIG. 5 as practical examples.

The measuring unit 41 measures the unwanted radio wave radiation as shown in FIGS. 4 or 5, and the comparing unit 42 compares the measured values with the reference value that is predetermined. For example, in the example of the measurement near the transmitting terminal shown in FIG. 4, when the reference value is supposed to be a level of −60 dBm, the comparing unit 42 notifies the management information generating unit 43 that the measured values are greater than the reference value in a range C of the frequency between 14.6 MHz and 16.0 MHz and in the range A of the frequency between 26.3 MHz and 28.0 MHz.

The management information generating unit 43 receives the notice from the comparing unit 42, and generates the management information containing that "in the measurement near the transmitting terminal, the measured values are greater than the reference value in the range C of the frequency between 14.6 MHz and 16.0 MHz and in the range A of the frequency between 26.3 MHz and 28.0 MHz," and then notifies the communication device 100 and the communication device 200 of the management information. (The communication device 100 and the communication device 200 are respectively the modem 101 and the modem 201 in the above-mentioned simulation).

Upon receipt of the notice, the communication device 100 reduces the transmission power of the carriers related to the frequency ranges wherein the measured values shown in the management information are greater than the reference value, and controls the unwanted radio wave radiation so as not to exceed the reference value.

In the above-mentioned simulation, the spectrum analyzer 120, which corresponds to the measuring unit 41, has used the core-less coil as the detection means of the unwanted radio wave radiation, but the detection means of the unwanted radio wave radiation is not limited to the core-less coil.

When a cored coil, which the coil is wound around a ferrite bar core of high permeability, is used as the detection means, detection sensitivity can be raised and the directivity of the detection sensitivity can be raised. The cored coil can be arranged to be less sensitive to external electric wave that becomes noise from surrounding environment, but more sensitive to the unwanted radio wave radiation from the balanced transmission line 50. Therefore, the measuring unit 41 with high sensitivity is realizable.

A thin film coil can also be used for the detection means. In this case, since the thin film coil can be formed on the same substrate as a part of the electronic circuit of the measuring unit 41, the measuring unit 41 can be realized to be small-sized.

A magnetic field sensitive semiconductor element, typically a hole element, can also be used for the detection means. In this case, the measuring unit 41, which has the small-sized high-sensitive detection means, is realizable.

In the above-mentioned simulation, although the spectrum analyzer 120, which corresponds to the measuring unit 41, has measured the signal of the unwanted radio wave radiation for every frequency, the same effect is acquired even when the spectrum analyzer 120 measures the average effective value of the unwanted radio wave radiation. In this case, the communication device 100 does not need to control the transmitting power per carrier, but needs to control the total transmitting power as a whole. Therefore, the simple control regarding the unwanted radio wave radiation becomes possible.

EMBODIMENT 3

Figure 6:
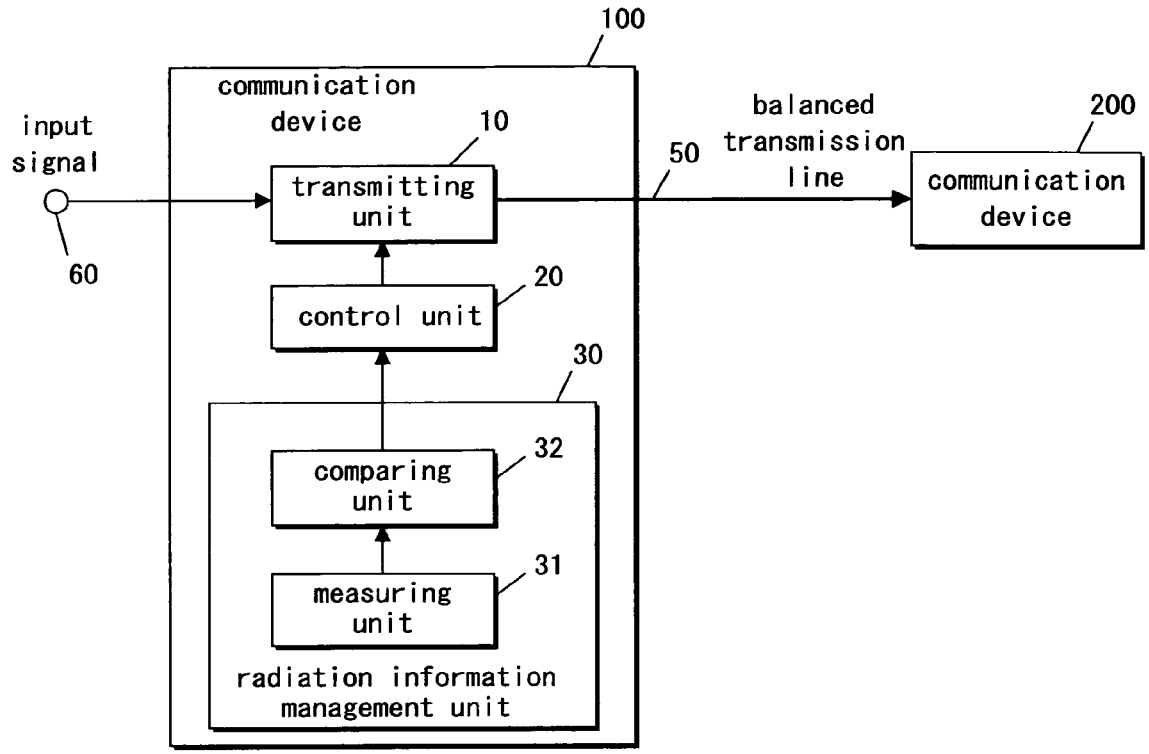
FIG. 6 is a block diagram illustrating a communication device according to Embodiment 3 of the present invention.

FIG. 6 is a block diagram of the communication device 100 in Embodiment 3 of the present invention.

The communication device 100 of the present embodiment comprises a transmitting unit 10, a control unit 20, and a radiation information management unit 30. The radiation information management unit 30 comprises a measuring unit 31 and a comparing unit 32.

In the following, the outline of operation of the communication device 100 of the present embodiment is described.

The transmitting unit 10 transmits carriers, which are modulated by an input signal inputted from an input terminal 60, to the communication device 200 that is a receiver via the balanced transmission line 50.

In the radiation information management unit 30, the measuring unit 31 detects the unwanted radio wave radiation from the balanced transmission line 50 due to the carriers sent out to the balanced transmission line 50 from the transmitting unit 10. The measuring unit 31 detects the unwanted radio wave radiation in the vicinity of the communication device 100. As the detection means of the unwanted radio wave radiation, the measuring unit 31 can use the core-less coil, the cored coil, the thin film coil, or the magnetic field sensitive semiconductor element, described in Embodiment 2 of the present invention.

The comparing unit 32 compares the measured value of the unwanted radio wave radiation, which the measuring unit 31 has measured, with the reference value that is predetermined, and notifies the control unit 20 of the compared result when the measured value is greater than the reference value.

Based on the compared result of the comparing unit 32, the control unit 20 controls the transmission power of the transmitting unit 10, limiting the unwanted radio wave radiation less than the reference value.

The unwanted radio wave radiation from the balanced transmission line 50 due to the communication device 100 can be always controlled to be less than the reference value, by continuously performing in real time the measurement of the measuring unit 31, the comparison of the comparing unit 32, and the control of the control unit 20.

In the same way as Embodiment 2 of the present invention, the measuring unit 31 of the present embodiment may measure the unwanted radio wave radiation for every frequency, and may measure the average effective value of the unwanted radio wave radiation in the frequency bandwidth that is in use. When measuring the unwanted radio wave radiation for every frequency, the control unit 20 can perform fine control so that the unwanted radio wave radiation may reduce the transmitting power of the carrier related to the frequency which the unwanted radio wave radiation is greater than the reference value. When measuring the average effective value of the unwanted radio wave radiation, the control unit 20 can perform simple control so that the transmitting power of all carriers may be uniformly reduced.

EMBODIMENT 4

Figure 7:
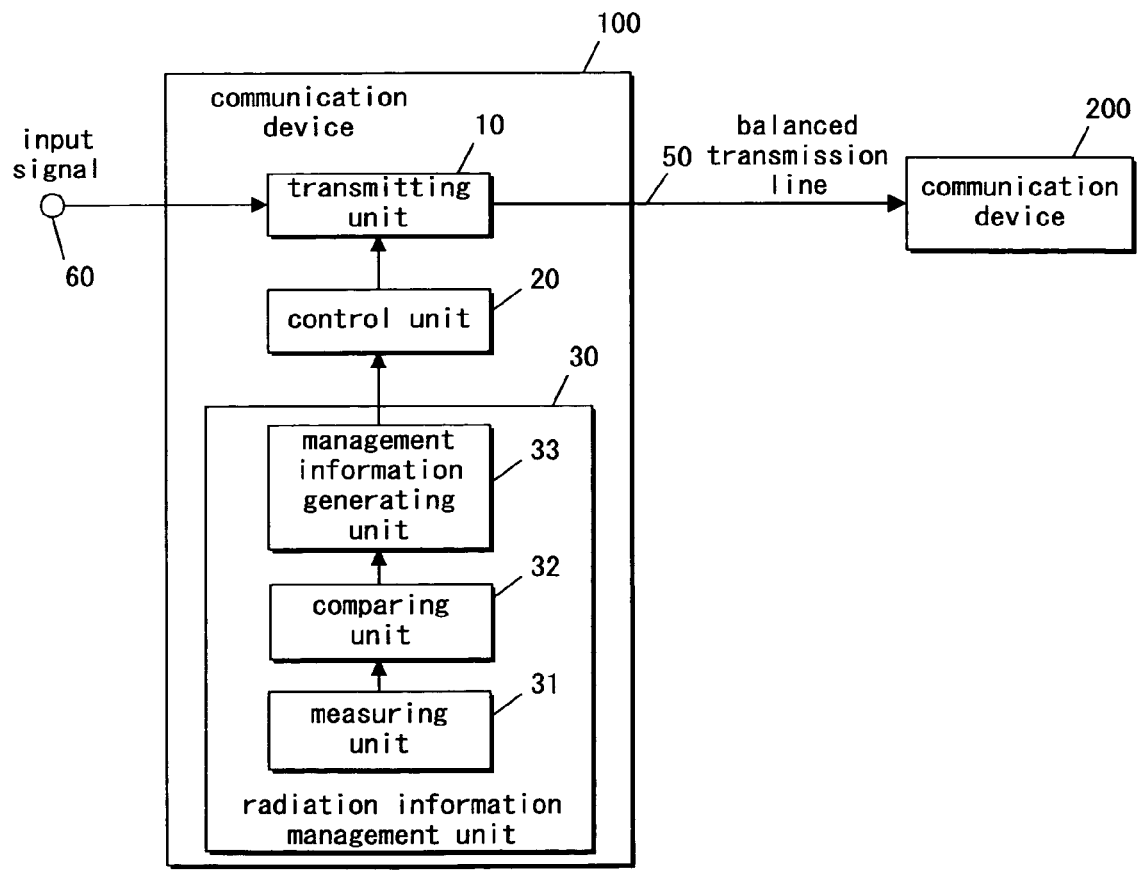
FIG. 7 is a block diagram illustrating the communication device according to Embodiment 4 of the present invention.
Figure 8:
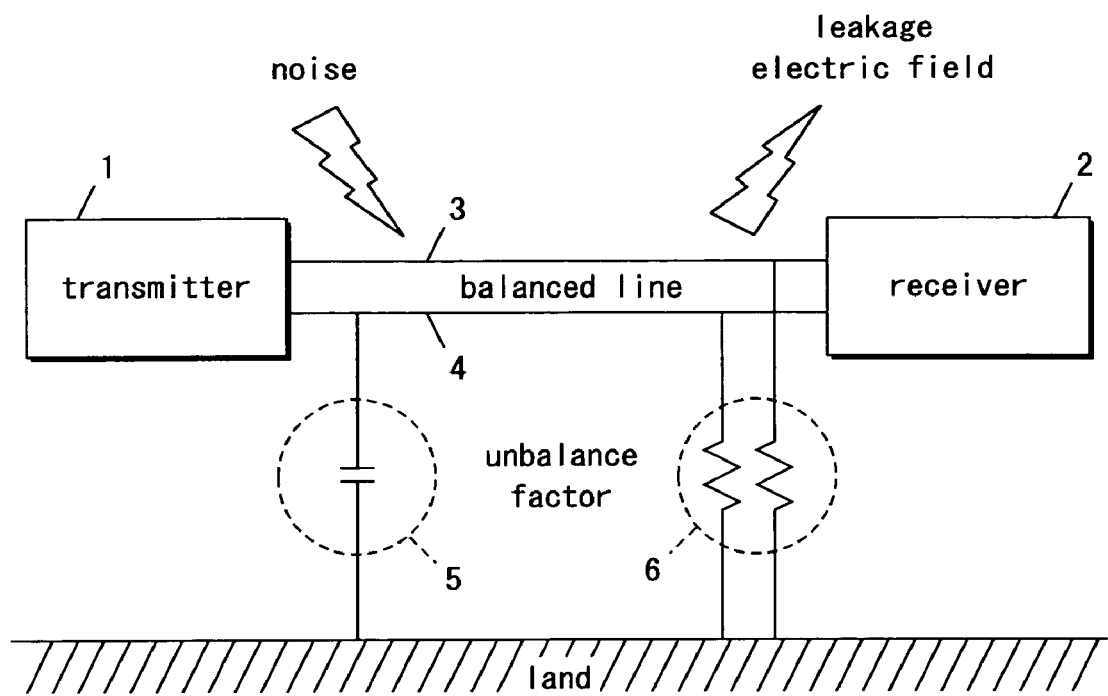
FIG. 8 is an illustration showing a balanced transmission system according to the prior art.

FIG. 7 is a block diagram of the communication device 100 in Embodiment 4 of the present invention.

The communication device 100 of the present embodiment comprises the transmitting unit 10, the control unit 20, and the radiation information management unit 30. The radiation information management unit 30 comprises the measuring unit 31, the comparing unit 32, and a management information generating unit 33.

In the following, the outline of operation of the communication device 100 of the present embodiment is described.

The transmitting unit 10 transmits a carrier, which is modulated by an input signal inputted from the input terminal 60, to the communication device 200 that is a receiver via the balanced transmission line 50.

In the radiation information management unit 30, the measuring unit 31 detects, in the vicinity of the communication device 100, the unwanted radio wave radiation from the balanced transmission line 50 due to the carrier sent out to the balanced transmission line 50 from the transmitting unit 10. As the detection means of the unwanted radio wave radiation of the measuring unit 31, the core-less coil, the cored coil, the thin film coil, or the magnetic field sensitive semiconductor element described in Embodiment 2 of the present invention can be used.

The comparing unit 32 compares the measured value of the unwanted radio wave radiation, which the measuring unit 31 has measured, with the reference value that is predetermined, and notifies the management information generating unit 33 of the comparison result when the measured value is greater than the reference value.

The management information generating unit 33 generates the management information related to the unwanted radio wave radiation, based on the comparison result notified by the comparing unit 32. The management information includes information that the measured value has exceeded the reference value. After generation, the management information generating unit 33 sends the management information to the control unit 20.

Based on the management information sent from the management information generating unit 33, the control unit 20 controls the transmission power of the transmitting unit 10, limiting the unwanted radio wave radiation less than the reference value.

In the same way as Embodiment 3 of the present invention, the unwanted radio wave radiation from the balanced transmission line 50 of the communication device 100 can be always controlled to be less than the reference value by continuously performing in real time the measurement of the measuring unit 31, the comparison of the comparing unit 32, and the control of the control unit 20.

In the same way as Embodiment 2 of the present invention, the measuring unit 31 of the present embodiment may measure the unwanted radio wave radiation for every frequency, and may measure the average effective value of the unwanted radio wave radiation in the frequency bandwidth that is in use.

When the measuring unit 31 measures the unwanted radio wave radiation for every frequency, the comparing unit 32 compares the signal of the unwanted radio wave radiation with the reference value for every frequency, and notifies the management information generating unit 33 of the frequency and signal level of the unwanted radio wave radiation which has exceeded the reference value. The management information generating unit 33 generates the management information including information related to the frequency and the signal level of the unwanted radio wave radiation which has exceeded the reference value. The control unit 20 controls the transmission power of each carrier which the transmitting unit 10 sends out, based on the management information. Therefore, the communication device 100 can perform fine control to restraint of the unwanted radio wave radiation.

When the measuring unit 31 measures the average effective value of the unwanted radio wave radiation, the comparing unit 32 compares the measured average effective value with another reference value. When the average effective value is greater than the reference value, the comparing unit 32 notifies the management information generating unit 33 of the fact that the average effective value is greater than the reference value. The management information generating unit 33 generates the management information including information that the average effective value of the unwanted radio wave radiation exceeds the reference value. Based on the management information, the control unit 20 uniformly reduces the transmission power of all carriers which the transmitting unit 10 sends out. Therefore, the communication device 100 can perform simple control to restraint of the unwanted radio wave radiation.

In the present embodiment, the management information generating unit 33 generates the management information regarding the unwanted radio wave radiation. By accumulating the management information as a data base, the radiation information management unit 30 can perform fine management regarding the unwanted radio wave radiation that is suited to the environment where the balanced transmission system is set up.

According to the present invention, it is possible to provide a radiation information management device that can measure unwanted radio wave radiation and manage the unwanted radio wave radiation based on the result of the measurement, and also to provide a communication device that can reduce unwanted radio wave radiation based on the result of the measurement.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A communication device operable to perform communication using a balanced transmission line, said communication device comprising:
   a transmitting unit operable to transmit a signal to the balanced transmission line;
   a control unit operable to control transmitting power put into the balanced transmission line by said transmitting unit; and
   a radiation information management unit operable to manage radiation information on radio wave radiation from the balanced transmission line,
   wherein said radiation information management unit comprises:
   a measuring unit operable to measure the radio wave radiation from the balanced transmission line, thereby outputting a measured radiation value; and
   a comparing unit operable to compare the measured radiation value with a predetermined reference value, thereby outputting a compared result,
   wherein said comparing unit informs said control unit of the compared result when the measured radiation value exceeds the predetermined reference value, and
   wherein said control unit controls the transmitting power put into the balanced transmission line by said transmitting unit, based on the compared result.

2. The communication device as defined in claim 1,
   wherein said radiation information management unit further comprises a management information generating unit operable to generate management information on the radio wave radiation, wherein when the measured radiation value exceeds the predetermined reference value, said management information generating unit generates the management information and informs said control unit of the management information, and wherein said control unit controls the transmitting power put into the balanced transmission line by said transmitting unit, based on the management information.

3. The communication device as defined in claim 2, wherein said measuring unit measures radio wave radiation from the balanced transmission line for a pre-designated frequency, thereby outputting a measured radiation value, wherein said comparing unit compares the measured radiation value with a predetermined reference value, and wherein when the measured radiation value exceeds the predetermined reference value, said management information generating unit generates the management information that includes information on the pre-designated frequency at which the measured radiation value exceeds the predetermined reference value.

4. The communication device as defined in claim 1, wherein said measuring unit measures an average effective value of the radio wave radiation from the balanced transmission line in a frequency range that said communication device uses.

5. The communication device as defined in claim 1, wherein said measuring unit measures the radio wave radiation from the balanced transmission line at a transmitting end of the balanced transmission line.

6. The communication device as defined in claim 1, wherein said measuring unit measures the radio wave radiation from the balanced transmission line at a receiving end of the balanced transmission line.

7. The communication device as defined in claim 1, wherein said measuring unit measures the radio wave radiation from the balanced transmission line utilizing electromagnetic induction by a coil.

8. The communication device as defined in claim 7, wherein the coil is one of a core-less coil and a cored coil.

9. The communication device as defined in claim 7, wherein the coil is a thin film coil.

10. The communication device as defined in claim 1, wherein said measuring unit measures the radio wave radiation from the balanced transmission line utilizing a magnetic field sensitive semiconductor element.

11. The communication device as defined in claim 1, wherein the balanced transmission line includes a power line.

* * * * *